Dec. 3, 1963  T. F. NAGEY ETAL  3,113,089
SHIELD FOR INTERCEPTING RADIANT ENERGY FROM AN ATOMIC REACTOR
Filed Dec. 6, 1954  3 Sheets-Sheet 2
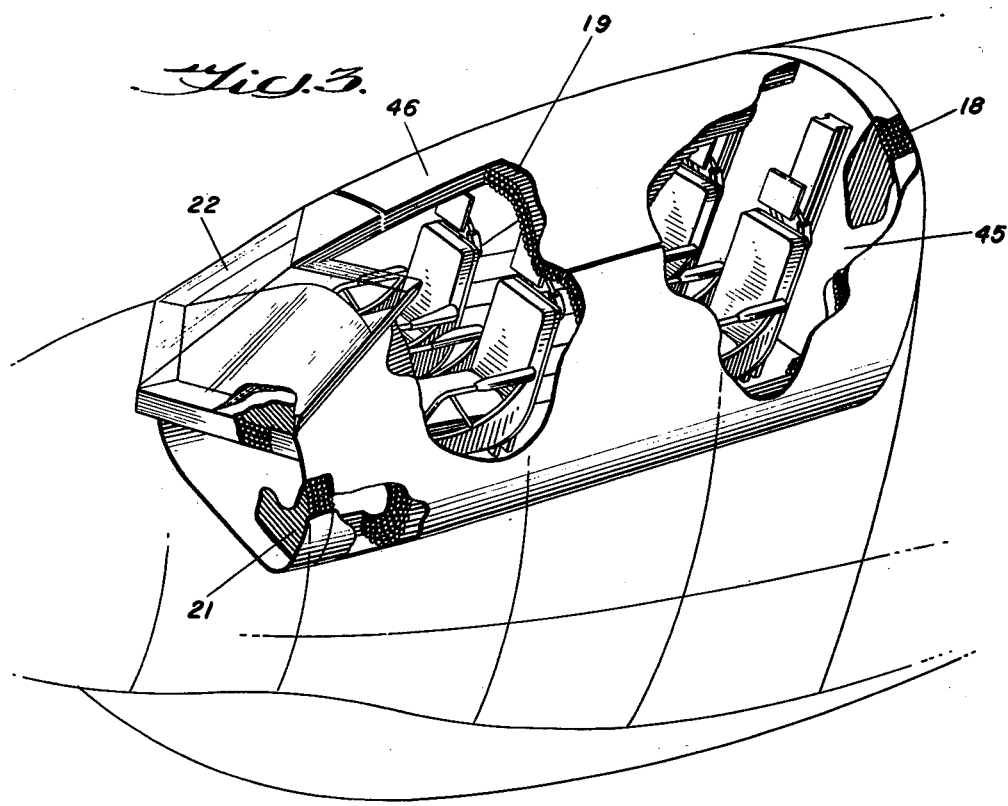
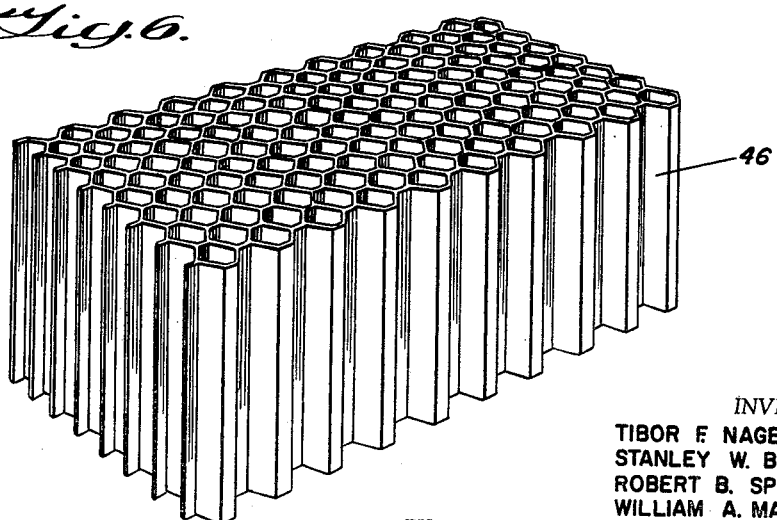
INVENTORS
TIBOR F. NAGEY
STANLEY W. BURRISS
ROBERT B. SPOONER
WILLIAM A. MAXWELL
BY Russell L. Root
ATTORNEY Dec. 3, 1963 T. F. NAGEY ETAL 3,113,089
SHIELD FOR INTERCEPTING RADIANT ENERGY FROM AN ATOMIC REACTOR
Filed Dec. 6, 1954 3 Sheets-Sheet 3
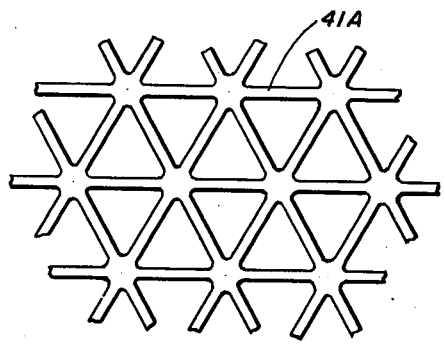
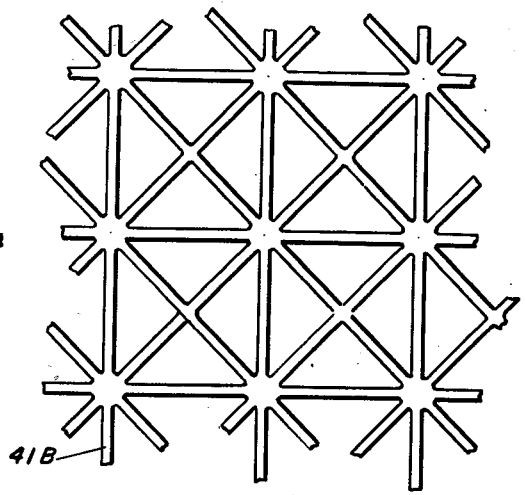
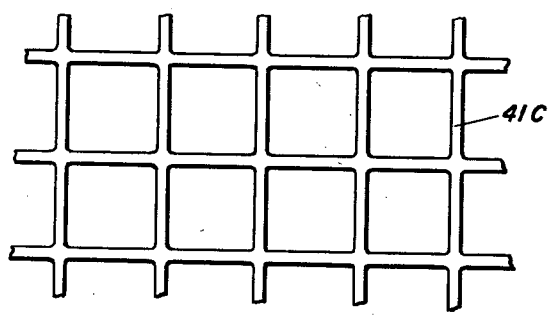
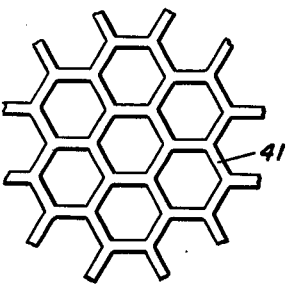
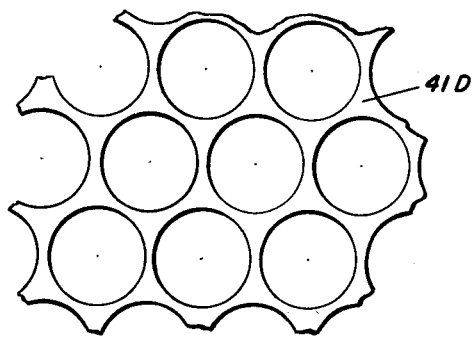
INVENTORS
TIBOR F. NAGEY
STANLEY W. BURRISS
ROBERT B. SPOONER
WILLIAM A. MAXWELL
BY Russell L. Root
ATTORNEY

United States Patent Office 3,113,089
Patented Dec. 3, 1963

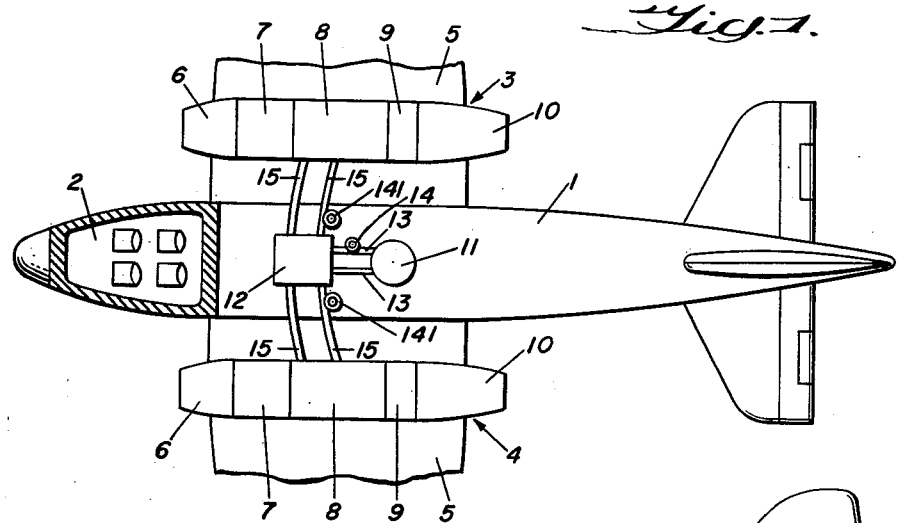
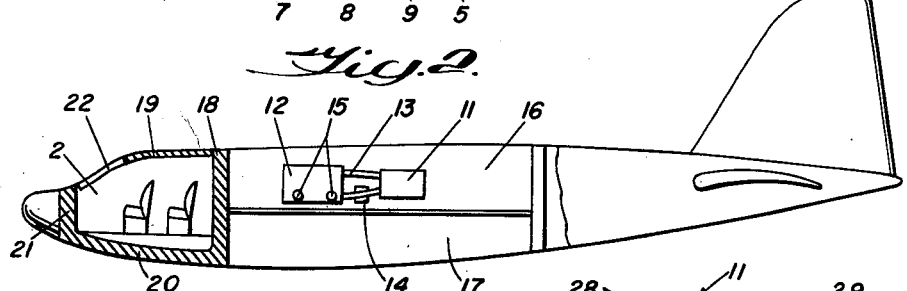
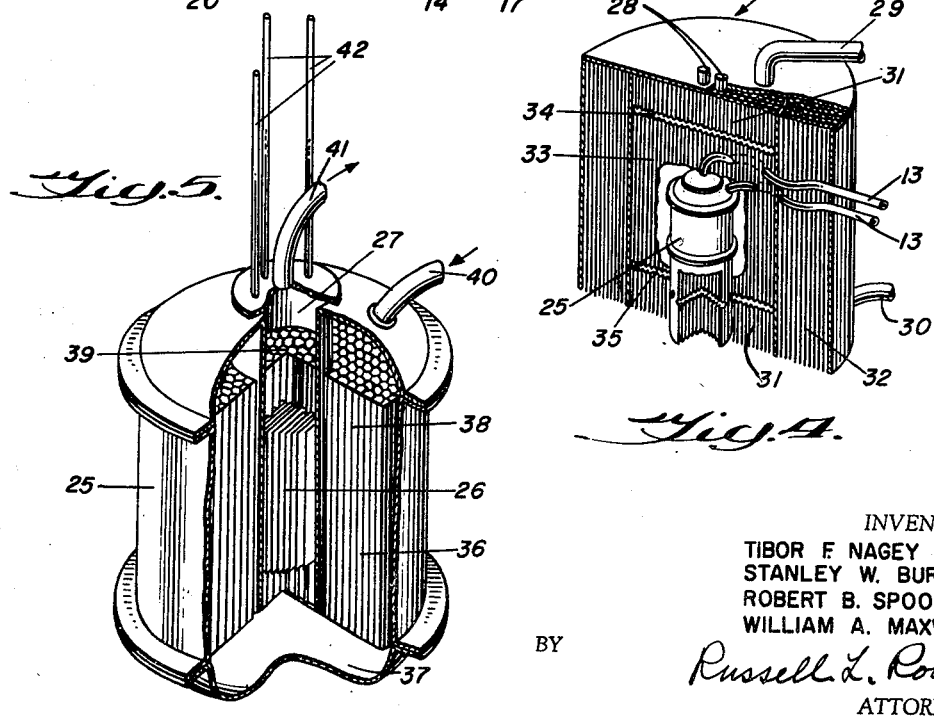

3,113,089
SHIELD FOR INTERCEPTING RADIANT ENERGY FROM AN ATOMIC REACTOR
Tibor F. Nagey, Towson, Md., Stanley W. Burriss, Van Nuys, Calif., and Robert B. Spooner and William A. Maxwell, Towson, Md., assignors to Martin-Marietta Corporation, a corporation of Maryland
Filed Nov. 24, 1954, Ser. No. 473,372
1 Claim. (Cl. 204—193.2)

This invention relates to a shield for intercepting radiant energy from an atomic reactor, more particularly, a lightweight, low-density structural shield for interposition between a reactor and the operating personnel, such as the crew, in the crew compartment of an aircraft.

The potentialities of atomic reactors, such as those disclosed in Chilowsky British Patent No. 648,293, as a source of power are well known, but it is also well known that such reactors give off harmful radiation especially in the form of gamma rays and neutrons, and the reactor must be well shielded to protect the personnel working around such reactor. To date, the shields have consisted for the most part of lead sheathing or concrete of considerable thickness. By reason of the weight of known shields, consideration has been given only to the use of atomic reactors as power plants in equipment in which weight is not a primary or severely limiting factor, such as stationary engines, submarines, ships, locomotives, etc. Other applications in vehicles would be possible and very desirable if effective shielding could be attained without extreme weight. One type of vehicle in which fuel supply is always an important problem and in which atomic energy might well provide the solution for that problem is, of course, aircraft, but the necessity for the extremely heavy shielding required to date has precluded practical consideration of atomic energy in aircraft.

This invention relates to a light-weight, but effective, radiation shield that can be used for many purposes, but particularly in aircraft to shield the crew from harmful radiation both from the reactor and the heat exchangers.

It is an object of this invention to provide a shield for radiation from a reactor consisting of a low-density cellular honeycomb material which, in and of itself, has radiant energy absorption properties. It is another object of this invention to provide a shield of a low-density cellular honeycomb material that has the property of absorbing harmful radiation from an atomic reactor, and further filling of the voids in said cellular material with liquids or solids also capable of absorbing radiation. It is a further object of this invention to provide a shielding material that is of sufficiently low density and light weight, but effective enough in absorbing radiation so that it can be used in aircraft construction. It is a further object of this invention to provide an effective shield which can be used as a core of a sandwich panel to provide a structure having a high strength-to-weight ratio which is accordingly capable of use as a portion of the structure of an aircraft, whereby it will serve in a dual capacity, thus further controlling the critical weight factor in aircraft.

Other further objects of this invention will be apparent from the description of the accompanying drawings, in which like numerals refer to like parts.

FIGURE 1 is a fragmentary plan view of an aircraft vehicle, showing jet engines powered by energy from an atomic reactor;

FIGURE 2 is a fragmentary elevational view of the fuselage of the aircraft shown in FIGURE 1;

FIGURE 3 is a fragmentary perspective view of the crew nacelle of the aircraft, showing the arrangement and location of the shield;

FIGURE 4 is a section through a reactor showing the location and arrangement of the shield;

FIGURE 5 is a fragmentary perspective view of the reactor showing the internal construction of heat exchanger and control rods;

FIGURE 6 is a perspective view of a cellular honeycomb shielding material in the form of a metal honeycomb, the plan view of which is shown in FIGURE 10; and FIGURES 7, 8, 9 and 11 show the plan views of other foraminous material used in the shielding material in this invention.

A jet engine or jet power plant consists essentially of three elements, an air compressor that is attached to the same shaft as a turbine, and located intermediate the compressor and turbine, a source of heat. The heat source is usually in the form of a combustion chamber to increase quickly the temperature of the air from the compressor and products of combustion to high heat, thereby expanding the gas in the combustion chamber and increasing its pressure so that as the gas passes through the turbine, it will cause rotation of the turbine and the compressor, and create thrust as the gas escapes through the exhaust or tail pipe at the rear of the engine. In the most common form of jet engine, a combustible fluid or fuel is introduced into the chamber intermediate the compressor and the turbine to generate the heat required to expand the gas. Other sources of heat can, however, be used for this purpose, and an atomic reactor is essentially such a source of heat. For application to a jet engine the combustion chamber may, for example, be replaced by a heat exchanger wherein a heated fluid drawn from the atomic reactor is circulated in such a way as to cause an increase in temperature of the air or gas between the compressor and turbine.

The atomic reactor, in the example set out above, is simply a source of heat from nuclear fission, or atomic energy. In its simplest form, an atomic reactor is merely a container which has in its core a quantity of uranium 235 or other fissionable material. Surrounding the fissionable material is a primary heat exchanger in which is circulated a substance capable of absorbing the very high energy generated by nuclear fission, such as metallic sodium. Intermediate the fissionable material and the heat exchanger are placed a plurality of so-called control rods. These control rods are of metal capable of absorbing neutrons such as cadmium, boron or hafnium. The insertion of these control rods can slow down or halt the fission process in the reactor and when removed, fission starts, resulting in the generation of tremendous heat in the reactor, which is transmitted through the heat-exchanging elements of the primary heat exchanger in the reactor to the heat-exchange medium such as metallic sodium. The structural parts of the reactor, of course, must be made of material such as zirconium, which is a comparatively light metal, but has high heat-resisting properties and does not absorb neutrons. Inasmuch as the heat-absorbing medium, such as metallic sodium, is rendered radioactive and is of a very high degree of heat, it is usual to insert a second heat exchanger in the form of a heat interchanger between the reactor and the power plant. It will be clear that without the very heavy shielding that is usually required, gamma rays and neutrons will escape from the reactor and cause harmful radiation in the vicinity of the reactor, heat exchangers and, possibly, power plant. Before use can be made of such a reactor and associated heat exchangers in vehicles such as aircraft, it is necessary to provide a very lightweight, but effective, shield from neutrons and gamma rays between, for example, the crew nacelle and the components from which harmful radiation may emanate.

By way of illustration, one application of the invention is shown in connection with an aircraft in FIGURE 1, in which a fuselage 1 is shown having at the forward end a crew nacelle 2 and power plants 3 and 4 mounted on wings 5, one at each side of the fuselage. The jet power plants 3 and 4 consist of intake or induction sections 6, compressor section 7, heat-exchange section 8 including a secondary heat exchanger, turbines 9 and exhaust sections 10. Atomic reactor 11 is located in the fuselage, together with heat interchanger 12. Pipes 13 conduct super-heated fluid from the atomic reactor assembly 11 to heat interchanger 12. Circulation between the atomic reactor assembly 11 and heat interchanger 12 is effected by circulating pump 14. Conduits 15 connect heat interchanger 12 and secondary heat exchanger 8. Circulation pumps 14′ and conduits 15 effect circulation between heat exchangers 8 and 12. The crew nacelle 2 is separated by a partition structure from the portion of the fuselage of the aircraft in which the reactor and heat exchangers are located. The partition structure includes a bulkhead 18 which is of a shielding construction that will subsequently be described. It will be noted that the top portion 19 of the partition structure, extending around to the side of the crew nacelle, as well as the bottom portion 20 of the partition structure are also of a shielding construction. The forward bulkhead 21 of the crew nacelle 2 is also shielded, leaving only the window 22, which is, of course, necessary for navigation, of a non-shielded or semi-shielded construction. Window 22 may be of a lead glass laminate in which layers of lead glass are laminated with a plastic material which afford some radiation absorption and protection from radiation from this direction. The crew nacelle is thus well shielded not only from direct, but scattered radiation by the effective distribution of the shielding construction.

It will be noted that reactor assembly 11 and heat interchanger 12 can be located as shown in the center section of the fuselage in the upper compartment 16 so that compartment 17 in the lower portion of the center section of the fuselage will be available for a bomb bay, camera equipment or cargo-carrying compartment.

In FIGURE 3, the orientation of the cellular honeycomb shielding material in the partition structure is shown. It will be noted that bulkhead 18 consists of a cellular shielding structure in which the apertures of the cellular material extend generally transverse to the path of radiation from the reactor assembly 11 or the heat interchanger 12 or generally parallel to the wall surfaces of the bulkhead or partition. The shielding material is similarly oriented in portions 19 and 21 so that the longitudinal apertures in the cellular material always extend generally transverse to what would be the path of any harmful radiation attempting to enter the crew space.

FIGURE 4 shows the assembly 11 including a reactor 25 having inlet and outlet conduits 13 for the intermediate heat-exchange fluid, such as metallic sodium. Actuating means are shown at 28 for the control rods of reactor 25. Conduits 29 and 30 are the inlet and outlet for a coolant for the shield of the reactor made in accordance with this invention. A fluid such as water may flow through inlet conduit 29 and cellular shielding material 33 and outlet conduit 30 for the purpose of removing some of the heat from the vicinity of the reactor and also for the reason that the water acts as an absorber of radiation to some degree. Spaces 34 and 35 act as headers for the distribution of the coolant through core 33. Shielding portions 31 and 32 which surround the reactor 25 and cooling section 33 may be of cellular material in which the voids in said material are filled with a stagnant liquid, or with plastic such as polyethylene which is capable of absorbing radiation.

The reactor 25 shown in FIGURE 5 has located in the central core 26 a small amount of fissionable material such as uranium 235, in a central chamber 27 surrounded by a chamber 36. End cap 37 affords communication between chambers 27 and 36. Chambers 27 and 36 are partially filled with a cellular material having longitudinally extending openings therethrough through which openings a heat-exchanging liquid medium, such as metallic sodium, passes through inlet 40 through cellular filler 38 and end cap 37 upwardly through cellular filler 39 and outlet 41. In passing the vicinity of the fissionable material, metallic sodium or other heat-exchanging medium absorbs heat which is carried to heat interchanger 12 where it may be transferred to another liquid medium for passage to the secondary exchanger 8. Control rods 42 are used to insert into the reactor to stop or slow up the reaction.

FIGURE 6 illustrates in detail a section of a material 41 which can be utilized as shielding material; its shape is shown in plan view in FIGURE 10. It is, due to its shape, commonly referred to as honeycomb material. The shielding material, as shown in FIGURE 6, is formed of a metallic or other solid material capable of absorbing radiation. The core or shield is formed with passages extending generally parallel to each other through the foraminous material, and of any desired pattern, as shown in connection with alternative shielding materials 41a, 41b, 41c and 41d illustrated respectively in FIGURES 7, 8, 9 and 11. The shielding material may be formed in any manner in which a plurality of strips of material may be arranged to form columns surrounding longitudinally extending voids. Sheets of the solid material may be corrugated with a half of a hexagonal form and the sheets of material stacked and secured together to form the honeycomb material 41 as shown in FIGURE 6. The sheets of strips may be secured together by an adhesive, by soldering, brazing or lead burning, where applicable, or the block of shielding material may be cast from metal or other suitable material in which case the voids may be slightly tapered to permit the withdrawal of the core element of a mold. It is important in the utilization of any of these shielding materials that the voids extend transversely of the radiation. It will be noted in FIGURE 3 that bulkhead 18 is made up of a shielding material in which the voids extend transverse to the path of radiation or in other words parallel to surface sheets such as sheets 45 which are used to finish off the bulkhead 18 of crew nacelle 2. The properties of lead as a shield are well known and it has been found that a cellular shield such as shown in FIGURES 6 to 11 can be formed of relatively thin lead foil or any one of the several materials described above and the voids in the shield filled with circulating water in the application where the shield is used as a heat exchange element or with polyethylene, which has a high neutron absorption capacity. In addition to lead foil, a shield may be formed of cast lead or of stainless steel foil bonded by high temperature brazing. Uranium foil may also be used bonded in any manner including a resin bonding adhesive. Aluminum foil may be used where the polyethylene filler is sufficient to absorb radiation. Steel foil may be used in a like manner. It is important to note that any of these shielding materials may be used as a low-density filler in laminar sandwich construction to achieve a panel like those designated 18, 19 or 21 in FIGURE 3, having a high strength to density ratio, which is very desirable in aircraft construction. Furthermore, the strength of panels and elements made according to the foregoing description is such that, while very light, they may still be substituted at many points for portions of the essential structure of the aircraft or other vehicle, whereby additional weight reductions can be effected by combining structural portions and shielding in a single element. It is to be understood that the surface sheets of the shielding panel may be of plastic, plastic reinforced with glass, or metal. In such a panel it should be noted that the tubular voids extend transverse to the path of radiation or parallel to the surface sheets to which they are bonded. The type of bonding, whether brazing or adhesive bonding, depends upon the degree of temperature resistance required from the structure. In most cases, where it is necessary to shield areas which are not subject to high temperature, resin adhesives are known sufficient for this purpose that will secure most metals to any surface sheet.

While several materials have been described as suitable for the low density cellular honeycomb or multi-cellular shield structure between surface sheets of metal or other material, as well as neutron radiation absorbing plastic or other materials for fillers for the voids in the shield structure, it is to be understood that certain changes, alterations, modifications and substitutions can be made within the spirit and scope of the appended claim.

We claim as our invention:

The combination with a nuclear reactor, of a load-bearing structural and shielding means comprising a honeycomb cellular metal structure and a substantially void free polyethylene filler in said cells, the cellular structure being positioned transversey to the path from the reactor to the area to be shielded whereby the metal structure acts as a shield for gamma radiation and the polyethylene as a shield from neutrons.

References Cited in the file of this patent

UNITED STATES PATENTS

| | | |
|---|---|---|
| 1,551,162 | Loebell | Aug. 25, 1925 |
| 2,133,385 | Freeman | Oct. 18, 1938 |
| 2,716,705 | Zinn | Aug. 30, 1955 |
| 2,744,042 | Pace | May 1, 1956 |
| 2,773,459 | Sechy | Dec. 11, 1956 |
| 2,796,529 | Morrison | June 18, 1957 |

OTHER REFERENCES

AECU, 1952, Atomic Energy Commission document, dated April 1, 1952, page 12.

Goodman et al.: Nucleonics, vol. 11 (No. 3, March 1953), pages 52 and 53.

The Science and Engineering of Nuclear Power, vol. II, Clark Goodman, Addison Wesley Press (1949), Cambridge, Mass., pp. 277–281.

Popular Science (October 1951, pp. 98–102).

American Aviation, vol. 14, #14 (July 15, 1950), pp. 11, 12, 13 and 15.

Metal Progress (May 1949, p. 635–638).